US009097585B2

(12) United States Patent
Sparks (10) Patent No.: US 9,097,585 B2
(45) Date of Patent: Aug. 4, 2015

(54) SPECTROGRAPHIC POLARIMETER AND METHOD OF RECORDING STATE OF POLARITY

(76) Inventor: William B. Sparks, Hampstead, MD (US)

( * ) Notice: Subject to any disclaimer, the term of this patent is extended or adjusted under 35 U.S.C. 154(b) by 108 days.

(21) Appl. No.: 13/608,539

(22) Filed: Sep. 10, 2012

(65) Prior Publication Data

US 2013/0063722 A1    Mar. 14, 2013

Related U.S. Application Data

(60) Provisional application No. 61/532,333, filed on Sep. 8, 2011.

(51) Int. Cl.
*G01J 3/447* (2006.01)
*G01J 3/44* (2006.01)

(52) U.S. Cl.
CPC ... *G01J 3/447* (2013.01); *G01J 3/44* (2013.01)

(58) Field of Classification Search
CPC ........................................................ G01J 3/447
USPC ................................................. 356/322, 327
See application file for complete search history.

(56) References Cited

U.S. PATENT DOCUMENTS

| 4,671,660 | A  * | 6/1987  | Distl et al. ..................... 356/367 |
| 6,850,326 | B2   | 2/2005  | Thoma et al. |
| 7,034,938 | B1 * | 4/2006  | Miles et al. .................... 356/364 |
| 2003/0067600 | A1 * | 4/2003 | Curtiss ......................... 356/328 |
| 2005/0007591 | A1   | 1/2005  | Shribak et al. |
| 2006/0238759 | A1   | 10/2006 | Okabe et al. |
| 2007/0030551 | A1 * | 2/2007  | Oka et al. ...................... 359/237 |
| 2010/0271475 | A1   | 10/2010 | Schwiegerling et al. |
| 2011/0080586 | A1   | 4/2011  | Okabe et al. |

OTHER PUBLICATIONS

A. M. Locke et al., "Snapshot Imaging Spectropolarimeter", Optical Sciences Center, University of Arizona, Tuscon, AZ 85721.
Snik et al., "HARPSpol—The New Polarimetric Mode for HARPS", Telescopes and Instrumentation (2009).
Rietjens, J.H.H. et al, SPEX: The Spectropolarimeter for Planetary Exploration, International Conference on Space Optics (2010).
Hana, Jie et al., "A single Channel Spatial Polarization Encoding and Decoding Method Based on Photoelastic Modulator", Preceedings of the SPIE, vol. 7511, pp. 75110R-75110R-9 (2009).

(Continued)

*Primary Examiner* — Kara E Geisel
*Assistant Examiner* — Hina F Ayub
(74) *Attorney, Agent, or Firm* — Ober, Kaler, Grimes & Shriver; Royal W. Craig (57) ABSTRACT

A single-shot real-time spectropolarimeter for use in astronomy and other sciences that captures and encodes some or all of the Stokes polarization parameters simultaneously using only static, robust optical components with no moving parts is described. The polarization information is encoded onto the spectrograph at each wavelength along the spatial dimension of the 2D output data array. The varying embodiments of the concept include both a two-Stokes implementation (in which any two of the three Stokes polarization parameters are measured) and a full Stokes implementation (in which all three of the Stokes polarization parameters are measured), each of which is provided in either single beam or dual beam forms.

31 Claims, 5 Drawing Sheets

(56) References Cited

OTHER PUBLICATIONS

Oka, K. et al., "Compact Complete Imaging Polarimeter Using Birefringent Wedge Prisms", Opt. Express 11, 1510-1518 (2003).

Kobulnicky, H.A. et al., "The Prime Focus Imaging Spectrograph for the Southern African Large Telescope: Operational Modes" at http://www.physics.rutgers.edu/-pryor/ph629/pfisobsmodes.pdf.

* cited by examiner

SPECTROGRAPHIC POLARIMETER AND METHOD OF RECORDING STATE OF POLARITY

CROSS-REFERENCE TO RELATED APPLICATION(S)

The present application derives priority from U.S. Provisional Patent Application No. 61/532,333 filed 8 Sep. 2012.

STATEMENT OF GOVERNMENT RIGHTS

The invention described herein was made with direct or indirect financial support by NASA, and is subject to the provisions of Public Law 96-517 (35 U.S.C. 202) in which the Contractor has elected to retain title.

BACKGROUND OF THE INVENTION

1. Field of the Invention

The present invention relates to the measurement of the polarization of light and particularly to the encoding of measured light polarization characteristics within a two dimension spectrographic array.

2. Description of the Background

Electromagnetic radiation in the form of light is characterized by various properties including intensity, direction of propagation, frequency or wavelength spectrum, and polarization. Analysis of the intensity and spectral characteristics of light is a common diagnostic approach for deducing related properties of the light's source, as well as reflection and transmission mediums between the source and the receiver. Collection and analysis of spectrographic information is a cornerstone approach to astrophysics and has applications in numerous other disciplines such as materials science, remote sensing, medical diagnostics, defense, biophysics, microscopy and fundamental physics. Most astronomical spectrographs use a telescope to focus light from an astronomical source onto a slit. Light from the slit is passed to a collimator which turns the diverging light beam into parallel light, and then to a disperser (usually a reflection grating) to create a spectrum, and then to a camera that focuses the spectrum onto a sensor such as a CCD. The horizontal axis of the spectral image no longer corresponds to a spatial direction in the sky, but rather now represents wavelength. The vertical axis of the image still corresponds to a spatial position of the incident light source. The result is a two-dimensional, spatially resolved spectrograph image comprising a band of varying intensity stretching across the image in the spectral direction and illustrating intensity as a function of wavelength. The image contains several spectra, each corresponding to a different position in the slit, or more precisely, a different part of the source along the slit.

Polarization is a property of light waves that describes the orientation of their oscillations. "Spectropolarimetry" is the measurement of the polarization of light that has been dispersed into a continuum or line spectrum as a function of wavelength. Spectropolarimetry provides a versatile suite of diagnostics tools. For example, in astrophysical research polarimetry can be used to deduce the properties of astrophysical dust when that dust scatters the light of a nearby star. The starlight becomes polarized when scattered by the dust in a way that depends on the size, porosity and composition of the dust particles. It is possible to measure these characteristics using polarimetry information of the scattered light. Consequently, scientific research based on spectropolarimetry techniques is undergoing a phase of rapid growth, especially in astronomy where spectropolarimetric observations are providing important clues as to planets, stars and the origins of the universe.

The polarization characteristic of light can described by the Stokes vector (I, Q, U, V) in which I is the total intensity, Q and U yield the linear polarization in each of two planes at 45 degrees to one another, perpendicular to the direction of wave propagation and, and V is the circular polarization. Normalized stokes polarization parameters (q, u, and v) represent the fractional polarization state (Q/I, U/I and V/I, respectively). Traditionally polarization measurements are made sequentially with polarizing filters at different orientations, with rotatable wave plates, or with complex, fragile, rapidly modulating components such as ferroelectric liquid crystals and resonant crystal photoelastic modulators (PEMs) to achieve high precision. However, sequential measurement entails moving parts, and modulating components typically lead to inherently monochromatic performance and component fragility, all of which introduce mechanical complexity, potential for error, and generally decrease the utility of polarimeters. Indeed, polarimeters employing such schemes are either too imprecise because of the need for sequential measurement, or too impractical for reliable deployment in a space based astronomical observatory.

The general concept of a "point-and-shoot" polarimeter capable of taking polarization measurements in real time is well-known. For example, United States Patent Application 20050007591 by Shribak et al. (Marine Biological Laboratory) shows a point-and-shoot polarization measurement system and method for a sampling spectrometer. The invention splits a light beam into several beams, which are analyzed using elliptical polarizers and the resultant intensity is measured. United States Patent Application 20100271475 to Schwiegerling et al. also shows a point-and-shoot imaging polarimeter. This Schwiegerling device is capable of acquiring all four components of the Stokes Vectors from an existing image without any moving parts. Rather, two Savart Plates are used in that device to generate four relatively shear beams to interfere at the imaging plane. United States Patent Application PG Publications 2006/0238759 and 2011/0080586 by Okabe et al. show a method of spectroscopic polarimetry in which two retarders are used to create a frequency dependent phase difference between the orthogonal polarization components of light under measurement. Amplitude and a phase of each of the carrier components are modulated by the Stokes Parameters of the light under measurement. It therefore becomes possible to obtain each of the Stokes Parameters by execution of signal processing with a computer by use of Fourier transformation. However, the method disclosed by Okabe et al. is designed for measuring polarization characteristics of a sample by decoding the polarization information using only Fourier analysis of the spectral amplitude variations. That is, the carrier amplitude variations are encoded along the same dimension as the wavelength amplitude variations (the spectrum). Neither it nor the foregoing references incorporate polarimetry in a conventional long-slit spectrograph which is more suited for astronomical spectrographs. With astronomical spectrographs, the scalar values of the digital image are typically replaced with scalar values yielding intensity at a location along one dimension, and wavelength (one spatial dimension and one spectral dimension). In this context spectroscopic polarimetry is more complex. The polarization characteristics must be encoded directly into the spectrum which is imaged onto a conventional detector, such as a CCD or CMOS, so that said characteristics can be derived by a processor. Okabe et al. modulate amplitude and phase of each of the carrier components by the Stokes Parameters of the light under measurement so that each of the Stokes Parameters can be derived by execution of signal processing with a computer by use of Fourier transformation. Along these same lines, A. M. Locke et al., "Snapshot Imaging Spectropolarimeter", Optical Sciences Center, University of Arizona, Tuscon, Ariz. 85721, discusses "channeled spectropolarimetry" which also uses amplitude modulation to encode the spectral dependence of all four Stokes parameters into a single spectrum, along with a Computed Tomography Imaging Spectrometer to provide imaging information. The spectropolarimetry data is represented as an image of a four-dimensional volume: two spatial variables (x, y), wavenumber ($\sigma$), and the Stokes vector index (j). The Stokes vector index has only four possible values (the integers from 0 to 3).

Snik et al., "HARPSpol—The New Polarimetric Mode for HARPS", Telescopes and Instrumentation (2009) which discusses the HARPS polarimeter. The HARPS polarimeter uses two optical fibers to split the collected light from the Cassegrain reflector into two orthogonal polarizations allowing sensitive and accurate measurements of both circular and linear polarisations of stellar light as a function of wavelength at high spectral resolution. The HARPS spectrograph shows both circular and linear polarizations for practically every spectral line.

J. H. H. Rietjens et al, SPEX: The Spectropolarimeter For Planetary Exploration, International Conference on Space Optics (2010) describes the use of multiple retarders and a beam slitter to modulate the radiance spectrum in both amplitude and phase by the degree and angle of linear polarization, respectively. The technique encodes the degree of linear polarization and angle of linear polarization of the incident light in the measured flux spectra.

The foregoing references form a spectrally dispersed image of the slit on a two-dimensional detector array. Thus one (spectral) dimension on the detector array (perpendicular to the entrance slit) corresponds to wavelength while the other spatial dimension corresponds to spatial position along the slit. The references encode the polarization information along the spectral dimension (the direction of dispersion perpendicular to the slit), not the spatial dimension (along the slit).

It would be more advantageous to encode the polarization information directly onto the spectrograph imaged on the spatial dimension of the detector/CCD itself so that a single acquired image combines spatial, spectral, and polarimetric information allowing it to be analyzed in both the spectral dimension and polarimetric dimension. The present inventor accomplishes this by oversampling and expanding the spectrograph to show full-or-partial Stokes polarimetry data along the spatial direction (orthogonal to the slit).

SUMMARY OF THE INVENTION

It is, therefore, an object of the present invention to provide a spectrographic polarimeter capable of simultaneous detection and recordation of the state of polarization of incident light.

It is another object of the present invention to record the Stokes Q, U and V polarimetry parameters along the spatial axis of a two-dimension spectrographic plot.

According to the present invention, the above-described and other objects are accomplished, by a single-shot real-time spectropolarimeter for use in astronomical imaging capable in various embodiments of capturing and encoding some or all of the Stokes polarization parameters simultaneously using only static, robust optical components with no moving parts. The polarization information is encoded onto the spectrograph at each wavelength along the spatial dimension of the 2D output data array. The varying embodiments of the concept include both a two-Stokes implementation (in which any two of the three Stokes polarization parameters are measured) and a full Stokes implementation (in which all three of the Stokes polarization parameters are measured), each of which is provided in either single beam and dual beam forms and which also provides the spectral intensity parameter (Stokes I).

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present application discloses a single-shot real-time spectropolarimeter for use in astronomical observing capable in various embodiments of capturing and encoding some or all of the Stokes polarization parameters simultaneously using only static, robust optical components with no moving parts. The polarization information is encoded onto the spectrograph at each wavelength along the spatial dimension of the output 2D data array. The varying embodiments of the concept include both a two-Stokes implementation (measuring any two of the three Stokes polarization parameters) and full Stokes implementation (measuring all three of the Stokes polarization parameters) each of which is provided in either single beam or dual beam forms. Single beam polarimetry requires the entrance slit to be uniformly illuminated while dual beam polarimetry offers the prospect of spatially resolved polarimetry along the slit, a critical desire for astronomical applications.

Figure 1:
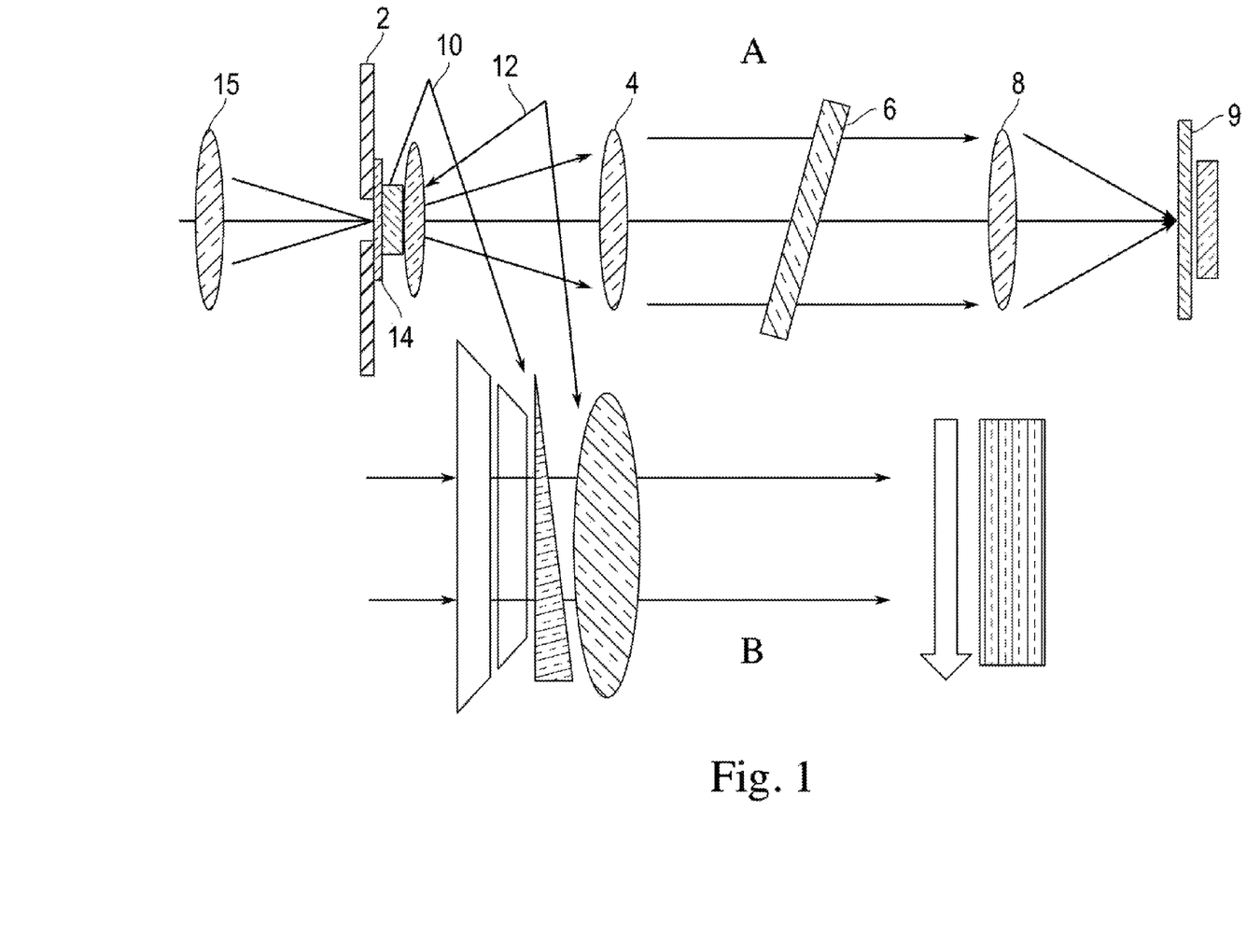
FIG. 1 is a schematic of a long slit spectrograph according with additional components included to the present invention to encode polarization information.

With reference to FIG. 1, a schematic diagram of a spectropolarimeter according to an embodiment of the present invention is shown which is in part a conventional long slit spectrometer including slit 2, collimator 4, dispersing element 6, focusing optic 8, and detector array 9. In addition, the spectropolarimeter includes an additional polarization-analytic optical platform comprising a bi-refringent wedge 10 and a polarizing element 12. In FIG. 1(A) the slit 2 is oriented perpendicular to the plane of the page, and in FIG. 1(B) the slit 2 is oriented within the plane of the page. In addition, for certain embodiments in which the linear polarization measurements Q and U perpendicular to the direction of wave propagation are desired, a quarter wave plate 14 (shown in dotted lines) is necessarily inserted before the birefringent wedge (as described more fully below).

As will be described, light, typically from an astronomical source, enters the slit 2 of the spectropolarimeter at the left of the diagrams of FIGS. 1(A) and 1(B). The light is collimated at collimator 4, which may be a lens or mirror element. The light is then dispersed at dispersing element 6 into its component wavelengths. Dispersing element 6 may be a conventional prism or, more commonly in modern spectrometers, a diffraction grating. Focusing optic 8 may comprise one or more lenses for focusing the component-dispersed light onto the two-dimensional surface of detector array 9. Detector array 9 may be a conventional astrophotometer two-dimensional CCD or CMOS rectangular photodetector array with multiple light-sensitive pixels arranged in a rectangular array of rows (parallel to a spatial axis X defined by the straight slit 2) and columns (parallel to the spectral axis Y). The slit 2 is imaged on to the detector array 9 by the spectrograph optics 4, 6, 8. The spectral axis Y of the component dispersed light is typically oriented perpendicular to the slit 2.

The detector array 9 detects and records the intensity of the incident light at each wavelength. The detector array 9 is essentially an electronic photon collector. The typical CCD camera used for astronomical applications consists of a two-dimensional array of photon detectors in a layer of semiconducting material that is placed at the focal plane of a telescope in order to collect an image. Each individual detector in the array 9 is referred to as a pixel and utilizes the photoelectric effect in which electrons are liberated and stored in the detector in direct proportion to the number of photons from the source that hit the pixel's detector surface. Each pixel in the detector array 9 thus operates as an electron well that accumulates liberated electrons in proportion to the intensity of the light that falls onto it, i.e., the number of incident photons. The number of electrons that can accumulate in each pixel is referred to as well depth and a typical astronomical CCD has a well depth on the order of $10^5$ electrons. Because a large number of photons need to be collected to do precision polarimetry, e.g., on an order of $10^8$ to measure polarization degree of $10^{-4}$, this requires multiple readouts (i.e. emptying) of the collected electrons from the well in the course of a single observation. A solution to this problem is to spread the light from the slit 2 outward over more than one well or pixel on the detector 9 surface so that the incident photons are distributed over and collected by a greater number of wells which together have a greater electron capacity. Consequently, multiple wells require fewer readouts and thus less time to accumulate detectably significant numbers of the electrons.

To accomplish spreading of the light over multiple wells, the light is spread out along the slit 2 before it enters the slit 2. This can be accomplished by a foreoptics 15 that directs the light beam 22 from the source onto the slit 2 so as to spread the light along the slit 2, which maps across a strip along the spatial axis of the detector 9 so that the incident photons are distributed over and collected by a greater number of wells which together have a greater electron capacity. A suitable foreoptic 15 may include a xenoplan bilateral telecentric lens, for example or a telescope. Alternatively, the incoming light may simply fall from a distance onto the slit 2 without any foreoptics other than suitable baffles to restrict the cone of acceptance, likewise spreading the light uniformly along the slit 2. Expanding the light in the spatial X dimension of the detector array 9 to cover a strip of adjacent rows within the CCD detector surface allows collection of light of a given intensity in more wells and results in faster accumulation of photons and thus faster detection of intensity. At the end of the integration period light is no longer allowed to reach the detector array 9 and the accumulated charge of each well is transferred, or read out, pixel by pixel from the array 9 to a computer to produce a digital image of the varying intensity of the light detected by the array 9.

Figure 2:
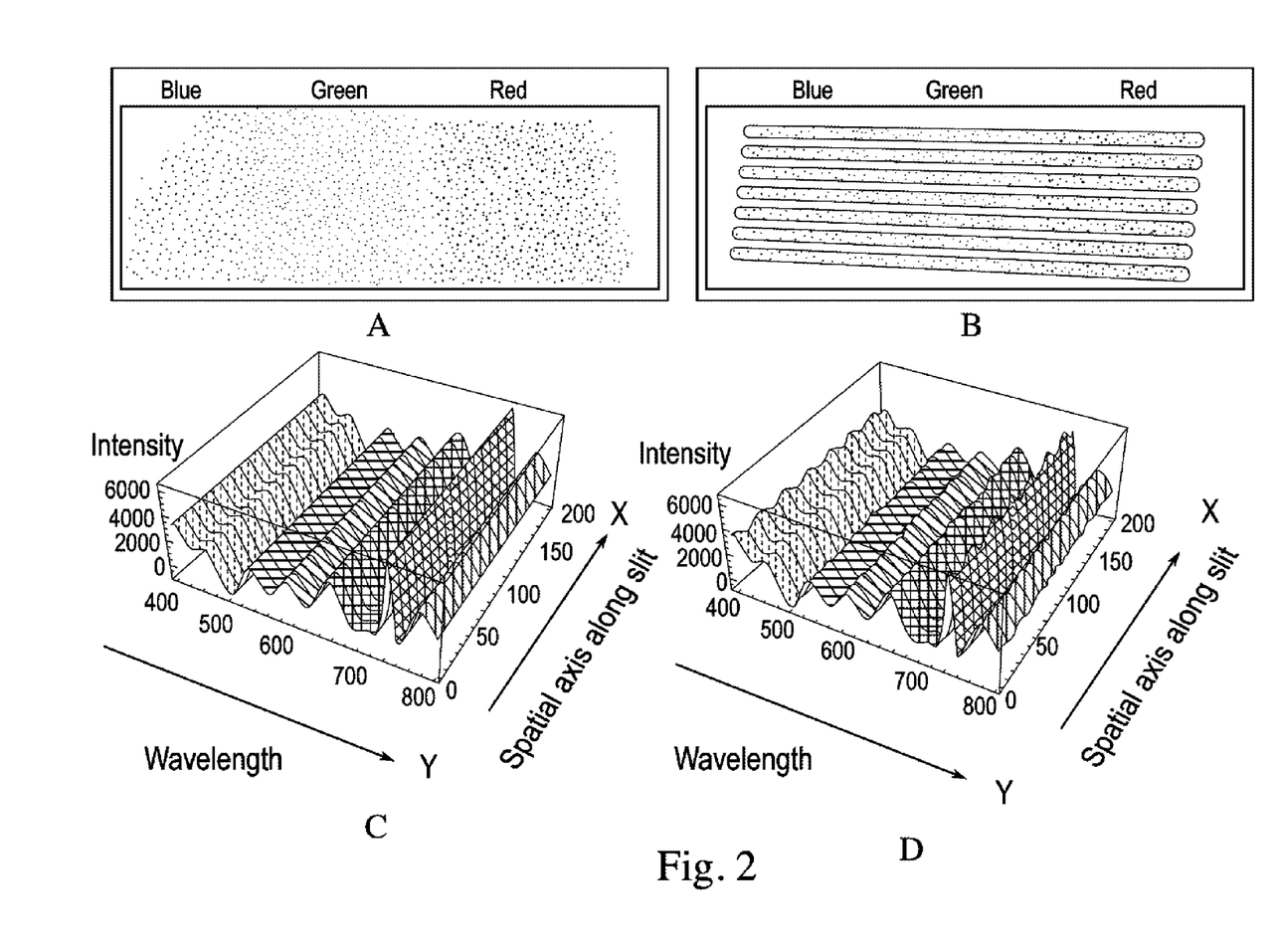
FIG. 2 is an illustration of the polarization encoding principle of the invention.

With no moving parts and only static, robust optics, it is possible to encode the polarization information on the spatial dimension of a 2D data array. FIG. 2(A) shows a two dimensional spectrum with wavelength running horizontally. FIG. 2(B) illustrates how fringes appear when polarized light is shone into the spectropolarimeter. Their depth yields the polarization degree and their phase, the direction of polarization. It is possible to encode all Stokes parameters using similar principles. FIG. 2(C_D) offer an illustration of the polarization encoding principle. In a conventional long-slit spectrometer without polarimetry optics, light expanded along this spatial X axis of the detector array 9 carries no information other than average intensity at a given wavelength, as seen by the constant intensity values along the spatial X axis in FIG. 2(C). Observe in FIG. 2(C) that the intensity level of the incident light is constant along the spatial axis X at each given wavelength. The present invention takes advantage of the fact that no information is found in the light expanded along the spatial axis of the detector array 9 by encoding polarimetric information along this spatial axis. It does this by modulating or varying the average intensity of light along the spatial X axis as a function of the polarity parameter(s) of the incident light. If light entering the slit 2 is polarized and if there is a gradient of retardance φ along the slit 2 of the spectrometer followed by a polarizing filter, then the intensity of the light detected along the spatial axis of the detector array 9 at a given wavelength is modulated as a function of one or more of the polarization parameters, with the spatial coordinate x on the detector mapping onto the retardance φ at any point along the spectrometer slit.

With renewed reference to FIG. 1, a gradient of retardance is provided by insertion of a birefringent (retarder) wedge 10 between the slit and the collimating element with the retarder wedge fast axis rotated at 45° to the slit and the wedge thickness gradient along the slit. Birefringent wedge 10 is a wedge shaped element of anisotropic materials, such as crystals of calcite or quartz. The birefringent wedge causes a phase shift between the two perpendicular linear polarization components of the light wave. The index of refraction along one axis of the birefringent wedge 10 (the fast axis) is smaller than the index along the perpendicular axis (the slow axis) such that light linearly polarized along the fast axis travels through the crystal at a faster rate than light with the perpendicular polarization, thereby creating the increasing phase shift or difference between the two as the thickness of the wedge increases. The phase shift between the two polarization components increases linearly with the increase in wedge 10 thickness.

Light exiting the wedge 10 passes through a polarization analyzer 12 (such as a polarizing filter) with the transmission axis aligned along the axis of the slit 2. If Stokes Q is arbitrarily selected to be the linear polarization component in a direction along the axis of the slit, then 100% of the linearly polarized Q component goes through the polarizing filter (i.e. full intensity) where retardance is zero. This may occur at the narrow tip of the wedge 10 where the thickness goes to zero though in practice that may be a virtual location. As the wedge 10 thickness increases, the phase shift of the Q component increases. At one quarter wave phase retardance, the Q component is changed to circularly polarized light and one-half of the light exiting the wedge 10 (i.e. half intensity) passes through the polarizer filter 12. At one-half wave phase retardance, the direction of the Q component is changed to be perpendicular to the polarizing filter 12 and no light passes through. At full wave phase retardance the direction of the Q-component is again aligned with the polarizing filter 12 and passes at full intensity.

Figure 3:
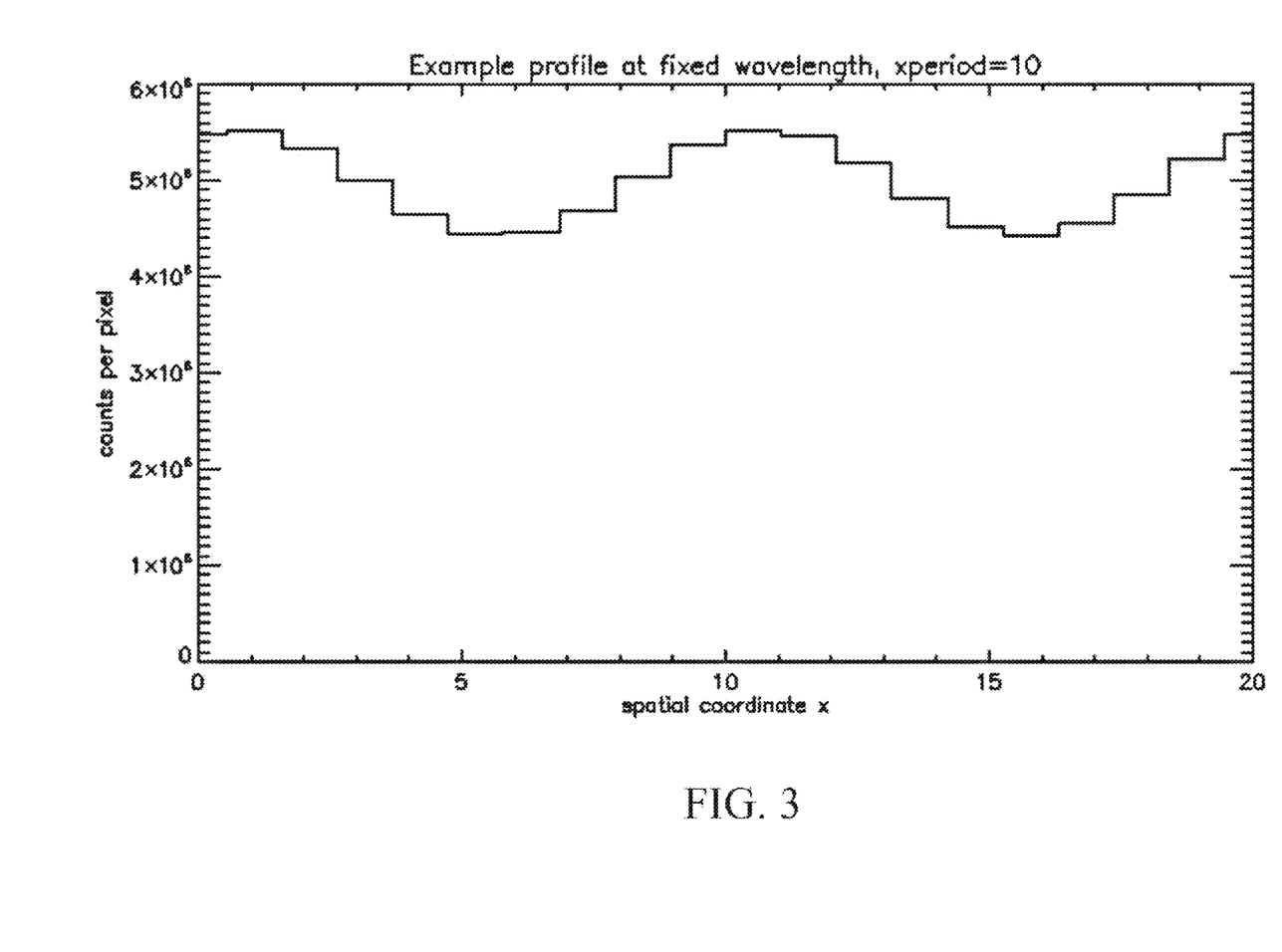
FIG. 3 is a graphical profile along the x-direction showing an example of the modulated intensity which encodes the polarization information.

Given the above-described optical platform, a modulation of light intensity is induced along the slit 2 given by Q cos(φ) where φ is the phase retardance, or x in detector 9 coordinates and the distance x corresponding to one wavelength of retardance is presumed known through calculation refined by calibration. With reference to FIG. 2(D), observe that the intensity of light at a given frequency varies along the spatial axis X according to a complex waveform. Phase retardance of the linearly polarized Stokes component U at 45 degrees to the slit 2 is constant and does not contribute to the waveform because U is aligned with the fast axis of the retarder wedge 10 and hence sees a only single refractive index. The circularly polarized component V of incident light however yields an intensity modulation equal to V sin(φ) in the same manner as the Q component. The intensity modulations of the V and Q components are combined on the two dimensional detector array 9 to form a singly-imaged waveform comprising the constituent elements for a given wavelength of light as seen in FIGS. 2(B) and 3. Muller matrix analysis may be used to derive expressions for the intensity modulation, which now encodes the Q and V polarization components as linear coefficients of trigonometric functions. It becomes possible to solve for the Stokes parameters Q and V given a measured array of intensities using a linear least-squares analysis (conventional linear least-square fitting of Stokes parameters as described in Auer, L. H., Heasley, J. N., & House, L. L., Sol. Phys., 55, 47 (1997) and other references). This is advantageous over the prior art references that encode the polarization information along the spectral dimension (the direction of dispersion perpendicular to the slit), as such compels the use of a Fourier analysis which can be quite unstable in the presence of incomplete waveforms.

It is unlikely, however, that only one of the linear Stokes parameter (Q) along with the circular stokes component (V) would be desired over the two linear components (Q, U). The circular polarization component V can be interchanged with the other linear component U by inserting an achromatic quarter wave plate 14 (dotted lines in FIG. 1) between the wedge 10 and the slit 2 with its fast axis aligned along the slit 2. A quarter wave plate 14, like the birefringent wedge 10, is an optical element of anisotropic material but is of constant and carefully selected thickness such that light linearly polarized on the slow axis is retarded by 90° in phase (a quarter wavelength) with respect to light linearly polarized on the fast axis. Quarter wave plate 14 has the effect of converting linearly polarized light to circularly polarized light and vice versa. Under this construction the output intensity I' along the spatial direction (x) is:

$$I'=0.5(I+Q\cos(\phi)+U\sin(\phi)) \quad (1)$$

where I is the unpolarized intensity.

In an alternate, two-beam embodiment of the present invention a beam-splitting polarizing prism such as a Wollaston prism is used as polarizing element 12, in place of the above-described polarizing filter, so that two versions of the spectra are obtained both resolved on adjacent sub-portions of the detector array 9. A Wollaston prism is an optical device that separates incident light into two orthogonal, linearly polarized outgoing beams. The intensity modulation I'$_1$ in x of the first outgoing beam is as for the single beam equation (1). The intensity modulation I'$_2$ in x of the second beam is:

$$I'_2=0.5(I-Q\cos(\phi)-U\sin(\phi))$$

The difference in beam intensity divided by the sum gives I''=(I'$_1$−I'$_2$)/(I'$_1$+I'$_2$):

$$I''=(Q\cos(\phi)+U\sin(\phi))/I=q\cos(\phi)+u\sin(\phi) \quad (2)$$

Where q and u are the normalized Stokes parameters. Observe that total intensity I along the slit has been eliminated from the equation which offers the means by which to accomplish higher polarimetric precision and higher spatial resolution along the slit, assuming polarization changes are less extreme than intensity changes (e.g. the image of a star has large intensity changes along the slit but its polarization is fixed). Equations (1) and (2) can alternately be written $$I'=0.5I(1+p\cos(\phi+2\theta)) \quad (3)$$

and $$I''=p\cos(\phi+2\theta) \quad (4)$$

where p=$\sqrt{q^2+u^2}$ is the degree of linear polarization, which has direction θ=tan$^{-1}$ (Q/U) relative to the x-axis. From this, it is apparent that the spatially modulated x-profile has an amplitude which is the degree of polarization and a phase zero-point from which the angle of polarization can be derived.

The zero of retardance for a single wedge 10 is at the tip of the wedge where the thickness goes to zero. It is also possible to use a birefringent wedge set comprising oppositely disposed wedges of birefringent material that have their optical axes oriented orthogonally to each other and to the direction of beam propagation. By compounding two wedges with identical but antiparallel retardance gradients, with their fast axes orthogonal to one another, a zero of retardance is obtained in the middle of the compound optic. This can be more convenient to work with and relaxes the spectral resolution requirements that are otherwise needed to ensure properly resolved fringes. The frequency with which spatial modulation takes place is doubled in this realization compared to a single wedge. An example of two-compounded wedges 10, 11 is shown below in the context of a full-Stokes polarimeter. One skilled in the art should understand that for both the single wedge 10 and double wedge 10, 11 cases, the individual wedges may be replaced by compound optics.

Although the above-described embodiments both provide useful results, it is even more desirable to simultaneously encode all three stokes polarization parameters (Q, U, V) on the spatial axis of the detector array 9. Such full-Stokes polarimetry can be accomplished in several ways according to the present invention. In a first such method, a dual slit spectropolarimeter is disclosed. With renewed reference to FIG. 1, a spectropolarimeter as previously described is provided in which light from an astronomical source enters the slit 2 and passes immediately through a birefringent wedge 10 (with the retarder wedge fast axis at 45° to the slit) and the wedge thickness gradient along the slit 2. Light exits the wedge 10 and passes through a polarization analyzer (filter) 12 whose transmission axis is aligned with the slit 2 and the light is focused on the detector array 9. Observe that the initial quarter wave plate 14 is omitted in this embodiment such that equations (1) and (2) in this embodiment become $$I'=0.5(I+Q\cos(\phi)-V\sin(\phi)) \quad (5)$$

and $$I''=q\cos(\phi)-v\sin(\phi) \quad (6)$$

As before, from the equations and a measured array of intensities, a measurement of one linear Stokes parameter, Q and the circular polarization Stokes parameter V is obtained using a linear least-squares analysis. A simple strategy to obtain the remaining linear stokes parameter U is to locate a second, parallel spectrometer slit 2, wedge 10 and analyzer 12 combination adjacent to the first with the fast axis of the second wedge and second transmission axis of the analyzer reversed. That is, the fast axis of the wedge/retarder 10 is aligned along the slit 2 and the analyzer 12 transmission axis is oriented at 45° to the slit 2. In this dual-beam embodiment the second parallel slit 2, second birefringent wedge 10 (with the retarder wedge fast axis at 45° to the slit), and polarizer 12 may be viewed as an independent realization of the two-stokes embodiment its entirety, and hence a second separate optical platform may be used with a separate detector 9 (or a single detector with segregated sensing areas for the two images). Light leaving the analyzer is focused on the detector. This configuration yields:

$$I''=u\cos(\phi)+v\sin(\phi) \qquad (7)$$

Equations (6) and (7) can be independently solved for (q,v) and (u,v), respectively so that a single value for each of q and u is obtained as well as two independent values of v. The circular component of the polarization causes a shift in the modulated wave corresponding to the level of circular polarization. However, a level of uncertainty results in this embodiment from difficulties in spatially registering the photon contribution from each of the two slits which view the target from slightly different perspectives.

Figure 4:
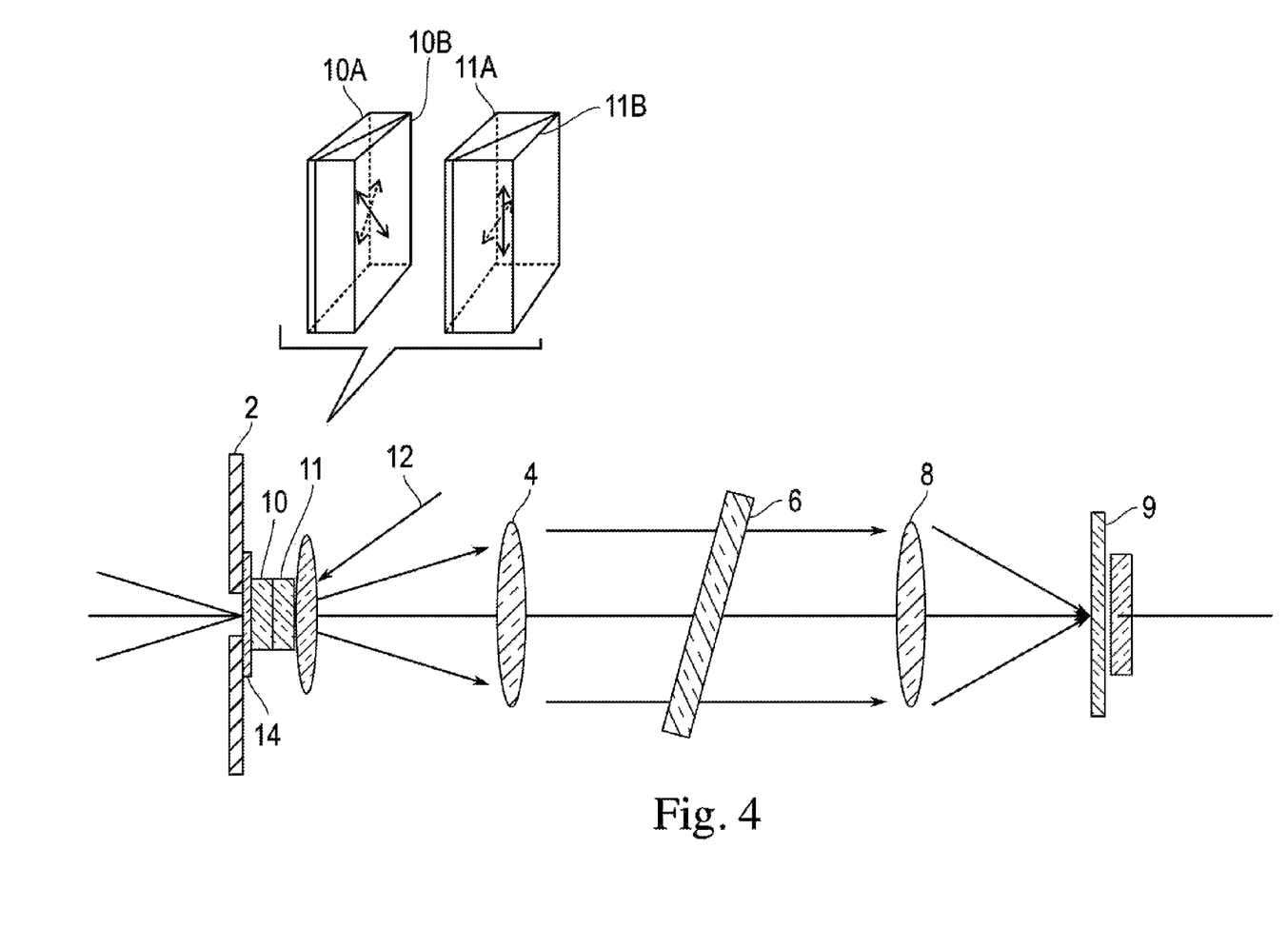
FIG. 4 illustrates a single-beam full Stokes embodiment that uses a second birefringent wedge.

FIG. 4 illustrates a more elegant solution than the dual-beam/single spectrograph slit 2 embodiment above using optical elements 10, 11 that yield two different retardance gradients. The optic 10 can be a wedge or wedge pair, as can the optic 11. In the case where it is a single wedge, the second wedge 11 can be parallel to the first wedge for simplicity and ease of computation, but not necessarily so and it may be antiparallel. Using a pair of birefringent wedge sets 10, 11 each comprising a birefringent wedge set 10A, 10B and 11A, 11B the second birefringent wedge set 11 having a with fast axis at 45° to the first, wedge set 10, the two optical axes of the wedge sets 10, 11 are oriented orthogonally to each other for each wedge pair, and to the direction of beam propagation. What matters is that the gradient of retardance of the second optic 11 is at a different angle and strength than the gradient of retardance of the first optic 10. In practice, there is no particular constraint on the degrees of difference but the computations are easier and the trigonometric terms can be made orthogonal which reduces the likelihood of cross-talk between the derived Stokes parameters with a suitable choice.

For each set (using 10 as an example), the second wedge 10B is in the same optical path as the first wedge 10A, and can even be cemented to the first wedge 10A to form a single compound optic (same for 11). This way, for each wedge set 10, 11 the zero of retardance is obtained in the middle of the compound optic making it easier to work with than a single wedge optic. For crystals such wedges 10 or 11, the birefringence is constant, being the difference in the two refractive indices. What varies is the "retardance" or "retardation" R, which is the phase difference due to the path length L times the birefringence B. It is the total retardance that matters (where retardance R=B*L), not the underlying birefringence, in providing a variation along the slit. Birefringent wedges or wedge sets 10, 11 introduce a retardance gradient.

In the illustrated embodiment the second wedge set 11 has twice the retardance gradient of the first wedge set 10. The foregoing is implemented in FIG. 4 as a dual-wedge 10, 11 full-Stokes spectropolarimeter in which light from an astronomical source enters the slit 2 and passes through the first birefringent wedge set 10 with the retarder fast axis at +/−45° to the slit 2 and the wedge set 10 thickness gradient along the slit. After passing through the first wedge set 10 the beam then passes through the second birefringent wedge set 11 with twice the retardance gradient, and having its fast axes at 45° to the fast axes of the first wedge set 10. After passing through both wedge sets 10, 11, the beam passes through a polarization analyzer 12 and then into the collimator 4 of a spectrograph. The image is recorded on the detector array 9 (e.g., CCD or CMOS sensor) of an imaging device. The polarization analyzer 12 can be a single polarizing analyzer (such as a polarizing filter), or a polarizing beam splitter (such as a Wollaston prism), as in the single wedge case. When a polarizing beamsplitter is used, as above, we obtain a dual-beam version of the dual-wedge optical platform. The angle of the analyzer 12 can be at any angle to the slit 2 however the choice of angle influences the performance of the system and the accuracy to which each of the Stokes parameters may be measured, example shown in FIG. 5.

Figure 5:
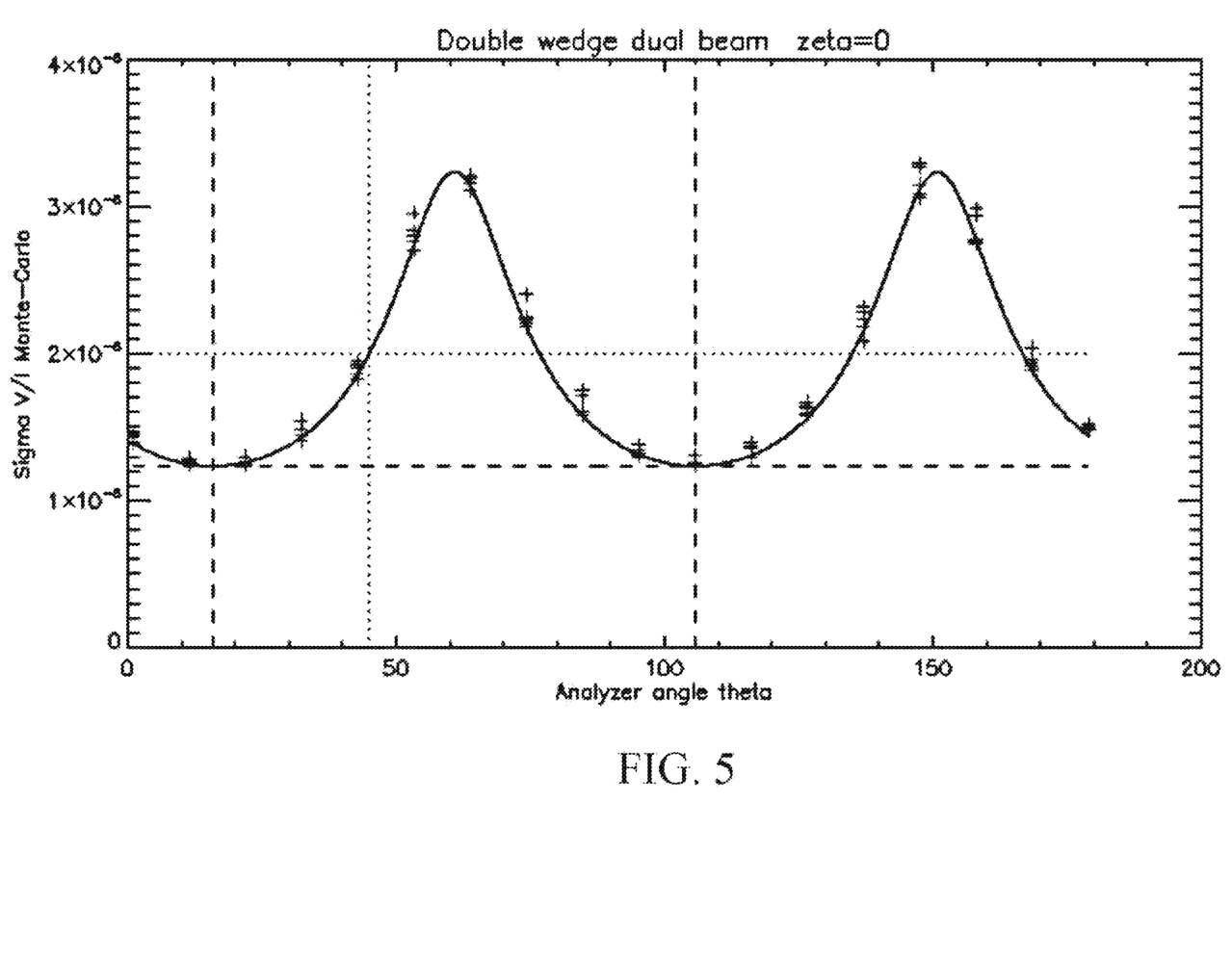
FIG. 5 depicts a Monte-Carlo simulation for the single beam dual wedge of FIG. 4 without phase offset.

FIG. 5 depicts a Monte-Carlo simulation for a single beam dual wedge 10, 11 without phase offset for the case $10^{10}$ photons collected. The curve shows the analytic model uncertainty derived from a least-squares data analysis approach. The figure shows the uncertainty on derived Stokes v (≡V/I) versus the analyzer angle for the antiparallel dual wedge example. Orthogonality occurs for =45° whereas minimum variance occurs for ≈106°.

It should now be apparent that the above-described embodiments provide a hardware platform and method for encoding polarization information directly onto the spectrograph imaged on the detector array 9 itself, by oversampling and expanding the spectrograph to show full-or-partial Stokes polarimetry data along the spatial direction (orthogonal to the slit).

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed:

1. A point-and-shoot spectropolarimeter for measuring at least one polarization parameter of incident light and recording said at least one polarization parameter in a single spectropolarimetric frame, comprising an entrance slit along an optical path of said incident light;
a first birefringent wedge positioned along said optical path and having a fast axis at 45° to said slit, and a thickness gradient along said slit;
a polarization analyzer having an axis of transmission at a known angle relative to said slit; and
a collimator for collimating diverging light from said polarization analyzer;
a disperser for producing optical spectra by diffraction or refraction of said collimated light;
a focusing optic for focusing the optical spectra onto a detector array;
a rectangular detector array for detecting intensity of light passed by said polarization analyzer along a spatial axis and wavelength of light passed by said polarization analyzer along a spectral axis;
whereby the intensity of light detected by said detector array is modulated along said spatial axis as a function of said at least one polarization parameter of said incident light to create an intensity-modulated waveform imaged onto said detector array and polarization measurements can be decoded from a single frame imaged at said detector array.

2. The spectropolarimeter of claim 1, wherein said at least one polarization parameter of said incident light comprises a first Stokes vector Q and a second Stokes vector V of said incident light, and
wherein the intensity of light detected by said intensity sensor is modulated on a spatial axis of said sensor as a function of said first and second Stokes vectors Q,V of said incident light.

3. The spectropolarimeter of claim 2, wherein said at least one polarimetry parameter of said incident light further comprises three polarimetry parameters of said incident light, and the intensity of light detected by said intensity sensor is modulated on a spatial axis of said detector array as a function of said three polarimetry parameters of said incident light.

4. The spectropolarimeter of claim 1, further comprising a second bi-refringent wedge having an optical axis oriented orthogonally to said first bi-refringent wedge.

5. The spectropolarimeter of claim 4, wherein said second bi-refringent wedge is attached to said first bi-refringent wedge.

6. The spectropolarimeter of claim 2, further comprising:
a quarter-wave plate along said optical path with fast axis along a direction of the slit before said first birefringent wedge, said first polarimetry parameter of said incident light being a measure of linear polarization in a first plane perpendicular to a direction of wave propagation and said second polarimetry parameter of said incident light being a measure of linear polarization in a second plane perpendicular to the direction of wave propagation, said second plane being at 45 degrees to said first plane.

7. The spectropolarimeter of claim 3, further comprising a second birefringent wedge along said optical path, either parallel or anti-parallel to said first birefringent wedge, and having twice the birefringence of said first birefringent wedge and having a fast axis at 45° to said first birefringent wedge, said first polarimetry parameter of said incident light being a measure of linear polarization in a first plane perpendicular to a direction of wave propagation, said second polarimetry parameter of said incident light being a measure of linear polarization in a second plane perpendicular to a direction of wave propagation, and said second plane being 45 degrees to said first plane, and said third polarimetry parameter of said incident light being a measure of the circular polarization of said incident light.

8. The spectropolarimeter of claim 7, further comprising a third bi-refringent wedge having an optical axis oriented orthogonally to said first bi-refringent wedge.

9. The spectropolarimeter of claim 8, wherein said second bi-refringent wedge is attached to said first bi-refringent wedge.

10. The spectropolarimeter of claim 8, further comprising a fourth bi-refringent wedge having an optical axis oriented orthogonally to said second bi-refringent wedge.

11. The spectropolarimeter of claim 10, wherein said fourth bi-refringent wedge is attached to said second bi-refringent wedge.

12. A long slit point-and-shoot spectrometer for recording at least one polarization parameter of light in a single recorded spectropolarimetric frame, comprising:
a spectrographic optical platform including,
a slit,
a collimator,
a dispersing element,
a focusing optic,
a two-dimensional detector array having a length and width dimension, the width corresponding to a spectral axis oriented perpendicular to the slit for sensing intensity of incident light at each wavelength along said slit, and said length comprising a spatial axis, the collimator and focusing optic being calibrated to dispersing light from said slit over a width of said detector array for faster accumulation of photons;
a first bi-refringent wedge positioned along the optical axis before the collimator; and
a polarizing analyzer positioned between said wedge and collimator;
said first bi-refringent wedge and polarizing analyzer creating a gradient of retardance such that the intensity of light detected along the spectral axis of the detector array is modulated as a function of at least one polarization parameter to create an intensity-modulated waveform imaged onto said detector array, whereby polarization measurements can be decoded from a single frame imaged at said detector array.

13. The long-slit spectrometer of claim 12, further comprising an achromatic quarter wave plate before the wedge and having a fast axis aligned along the slit.

14. The long-slit spectrometer of claim 12, wherein said polarizing analyzer is a polarizing filter.

15. The long-slit spectrometer of claim 12, wherein said polarizing analyzer is a beam-splitting polarizing prism.

16. The long-slit spectrometer of claim 12, wherein said at least one polarization parameter is encoded along the spatial axis of the detector array at each wavelength along the spectral axis.

17. The long-slit spectrometer of claim 12, wherein said first birefringent wedge has a fast axis and a slow axis, and an index of refraction along said fast axis is smaller than an index of refraction along said slow axis.

18. The long-slit spectrometer of claim 12, wherein light from a light source is spread along the spatial axis of the detector array.

19. The long-slit spectropolarimeter of claim 12, further comprising a second bi-refringent wedge having an optical axis oriented orthogonally to said first bi-refringent wedge.

20. The long-slit spectropolarimeter of claim 19, wherein said second bi-refringent wedge is attached to said first bi-refringent wedge.

21. The long-slit spectropolarimeter of claim 12, further comprising a second birefringent wedge having twice the birefringence of said first birefringent wedge and having a fast axis at 45° to said first birefringent wedge.

22. The long-slit spectropolarimeter of claim 21, further comprising a third bi-refringent wedge having an optical axis oriented orthogonally to said first bi-refringent wedge.

23. The long-slit spectropolarimeter of claim 22, wherein said third bi-refringent wedge is attached to said first bi-refringent wedge.

24. The long-slit spectropolarimeter of claim 23, further comprising a fourth bi-refringent wedge having an optical axis oriented orthogonally to said second bi-refringent wedge.

25. The long-slit spectropolarimeter of claim 24, wherein said fourth bi-refringent wedge is attached to said second bi-refringent wedge.

26. The long-slit spectrometer of claim 12, wherein said first birefringent wedge comprises a fast axis rotated 45° relative to said slit and a wedge thickness gradient along the slit.

27. The long-slit spectrometer of claim 12, wherein the intensity of light detected by said detector array is modulated along said spatial axis as a function of a first Stokes polarization parameter U and a second Stokes polarization parameter V of said light.

28. The long-slit spectrometer of claim 12, wherein the intensity of light detected by said detector array is modulated along said spatial axis as a function of a first Stokes polarization parameter V and a second Stokes polarization parameter Q of said light.

29. The long-slit spectrometer of claim 13, wherein the intensity of light detected by said detector array is modulated along said spatial axis as a function of a first Stokes polarization parameter Q and a second Stokes polarization parameter U of said light.

30. The long-slit spectrometer of claim 27, wherein the intensity of light detected by said detector array is modulated along said spatial axis as a function of said first and second Stokes polarization parameters U, V and a third Stokes polarization parameter Q of said light.

31. The long-slit spectrometer of claim 28, further comprising a second, parallel slit for two beam analysis.

\* \* \* \* \*